Patented Nov. 23, 1948

2,454,499

UNITED STATES PATENT OFFICE 2,454,499

X-RAY SCREEN

William H. Byler, Morris Plains, and Clayton C. Carroll, Madison, N. J., assignors to United States Radium Corporation, New York, N. Y., a corporation of Delaware No Drawing. Application November 21, 1944, Serial No. 564,549

1 Claim. (Cl. 117—33.5)

This invention relates to improvements in viewing screens, particularly X-ray viewing screens.

The use of viewing screens coated with a fluorescent material in X-ray technology, both for visual and photographic use, is known. In such screens, it is necessary that the phosphorescence of the luminous material be low and that the higher is the fluorescence, the better the screen. The reason the phosphorescence must be low is that it, to the extent the luminous material has the property, results in afterglow, which interferes with the use of the apparatus for the viewing of or taking of a succession of pictures. Heretofore the inhibition of phosphorescence has been obtained by the inclusion in the luminous material of a small amount of nickel, usually less than one part in 500,000. Nickel so used represses the phosphorescence to an extent such that screens coated with luminous material containing this small amount of nickel can be used, but it also reduces the fluorescence, that is, the brightness. The viewing screens heretofore available have been deficient both with respect to the degree of brightness and with respect to the degree of definition and contrast obtained, and have been subject to the disadvantage that at edges between light and dark areas there are confusing halo effects.

The present invention provides improved viewing screens in which the luminous material contains no determinable quantity of nickel, which have the necessary low phosphorescence, are desirably bright, and possess improved definition and contrast and are free from halo effects at the edges between dark and light areas.

In accordance with the present invention, the viewing screen is coated with a luminous material which consists of zinc and cadmium sulfides in proper proportions, together with silver, and, in some instances, gold, copper or manganese, or two or three of these materials, in very small proportions. The dominant wave length of the fluorescent color of the improved screens of the invention lies between 559 and 618 millimicrons, that is, in the region bounded by the line between yellowish green and yellow green, and the line between reddish orange and red, as defined in the article in the Journal of the Optical Society of America, volume 33, pages 627 to 632, (1943) by Kelly.

In this critical color range, the viewing screens show improved contrast, good definition, and freedom from halo at the edges between light and dark areas. The color range is above that of maximum visibility, which has heretofore been considered most desirable for fluorescent colors, and it was surprising to note that at these increased wave lengths better contrast and definition are obtained. In this connection it should be noted that it has heretofore been considered that improvement in definition can be obtained only by a decrease in the grain size of the luminous material, accompanied by a decrease in brightness. It could not have been foreseen that in viewing screens having dominant color wave lengths in the range of 559 to 618 millimicrons this improved definition could be obtained without sacrificing brightness by undue restriction of grain size.

The luminous material used for coating the viewing screens in accordance with the invention thus consists of cadmium and zinc sulfide, with a small amount of silver, and in some instances, small amounts of copper, gold or manganese with no nickel as inhibitor of phosphorescence.

In these luminous materials, the cadmium sulfide may be present to the extent of about 38 to about 70%. Below 38% cadmium sulfide, phosphorescence is too great, and prevents the satisfactory use of the mixture as the luminous material in a viewing screen. Above about 70%, the color is too dark and the brightness is too low. The amount of silver used will vary from one part in 3000 to one part in 100,000. One part in 20,000 gives good results. The amount of copper or gold should not exceed one part to 100,000 and the amount of manganese should not exceed one part in 10,000.

The luminous material is prepared by the usual procedure, by precipitation of the zinc and cadmium sulfides from solutions as free as possible from heavy metal impurities. The precipitated material is filtered and dried with care to prevent the introduction of heavy metals. The dried materials are mixed together in the selected proportions, and enough silver nitrate solution to give a silver content of about 1 to 20,000 is added. A few parts per hundred of one or more of the usual fluxing salts is then added, the mixture is dried and fired in a silica crucible at a temperature of 900 to 1300° C. The time and temperature of firing are determined by the grain size required for the proper balance of brightness and definition in the final product in accordance with the usual practice, it being noteworthy that in the products used in accordance with the invention, somewhat larger grain size, with improved brightness, can be used without sacrificing definition. If desired, the color of the luminous product may be shifted toward the red by the addition of small quantities of copper, manganese or gold along with the silver, as previously described.

The luminous material so prepared is applied to the screen in the usual way, as by compounding it in a lacquer or varnish base.

We claim:

An X-ray screen coated with a luminous material composed of zinc sulfide, cadmium sulfide, with a trace of silver, the cadmium sulfide content being above 38%, the silver content being not more than one part in 3000, and the balance being substantially all zinc sulfide, the dominant wave length of the fluorescent color of the luminous material being in the range of 559 to 618 millimicrons.

WILLIAM H. BYLER.
CLAYTON C. CARROLL.

REFERENCES CITED

The following references are of record in the file of this patent:

UNITED STATES PATENTS

| Number | Name | Date |
|---|---|---|
| 1,622,379 | Guntz | Mar. 29, 1927 |
| 2,075,399 | Levy | Mar. 30, 1937 |
| 2,099,023 | Levy | Nov. 16, 1937 |
| 2,126,233 | Wakenhut | Aug. 9, 1938 |

FOREIGN PATENTS

| Number | Country | Date |
|---|---|---|
| 406,957 | Great Britain | Mar. 8, 1934 |
| 424,195 | Great Britain | Feb. 11, 1935 |
| 640,056 | Germany | Dec. 21, 1936 |

OTHER REFERENCES

"Solid Fluorescent Materials," R. P. Johnson, article in the June 1940 edition of the "American Journal of Physics," vol. 8, No. 3, pages 143–153, inclusive. (Copy in Div. 54.)